US012750460B2

(12) United States Patent
Chen et al.

(10) Patent No.: US 12,750,460 B2
(45) Date of Patent: Sep. 29, 2026

(54) VIDEO SYNTHESIS METHOD BASED ON SURROUND VIEWING ANGLE, CONTROLLER AND STORAGE MEDIUM

(71) Applicants: MIGU VIDEO CO., LTD., Shanghai (CN); Migu Co., Ltd., Beijing (CN); China Mobile Communications Group Co., Ltd., Beijing (CN)

(72) Inventors: Xiaoyi Chen, Shanghai (CN); Huaide Li, Shanghai (CN)

(73) Assignees: MIGU VIDEO CO., LTD., Shanghai (CN); Migu Co., Ltd., Beijing (CN); China Mobile Communications Group Co., Ltd., Beijing (CN)

( * ) Notice: Subject to any disclaimer, the term of this patent is extended or adjusted under 35 U.S.C. 154(b) by 86 days.

(21) Appl. No.: 18/856,973

(22) PCT Filed: Jun. 9, 2023

(86) PCT No.: PCT/CN2023/099344

§ 371 (c)(1),
(2) Date: Oct. 15, 2024

(87) PCT Pub. No.: WO2023/237095

PCT Pub. Date: Dec. 14, 2023

(65) Prior Publication Data

US 2025/0126224 A1 Apr. 17, 2025

(30) Foreign Application Priority Data

Jun. 9, 2022 (CN) ......................... 202210651322.7

(51) Int. Cl.
*H04N 7/01* (2006.01)
*G06V 10/56* (2022.01)
(Continued)

(52) U.S. Cl.
CPC ........... *H04N 7/0135* (2013.01); *G06V 10/56* (2022.01); *H04N 1/60* (2013.01);
(Continued)

(58) Field of Classification Search
CPC .................................................... H04N 7/0135
See application file for complete search history.

(56) References Cited

U.S. PATENT DOCUMENTS

2016/0028997 A1 1/2016 Kanai et al.
2019/0064530 A1 2/2019 Lee et al.
(Continued)

FOREIGN PATENT DOCUMENTS

CN 109146833 A 1/2019
CN 109427283 A 3/2019
(Continued)

*Primary Examiner* — Michael H Hong
(74) *Attorney, Agent, or Firm* — Price Heneveld LLP

(57) ABSTRACT

A video synthesis method based on surround view, a controller and a storage medium are provided, where the method applied to a client includes: after receiving video data pushed by a server, parsing the video data according to a first viewing angle range predetermined in the video data, and presenting an image; after receiving a user's viewing angle adjustment input, determining a second viewing angle range adjusted by the user, according to the viewing angle adjustment input; and performing, according to the second viewing angle range, an adaptive frame interpolation processing to obtain an adaptive image that meets the second viewing angle range, and performing a presentation based on the adaptive image.

13 Claims, 5 Drawing Sheets

(51) Int. Cl.
*H04N 1/60* (2006.01)
*H04N 21/218* (2011.01)
*H04N 21/234* (2011.01)

(52) U.S. Cl.
CPC . *H04N 21/21805* (2013.01); *H04N 21/23418* (2013.01); *H04N 21/23424* (2013.01)

(56) References Cited

U.S. PATENT DOCUMENTS

| | | | | |
|---|---|---|---|---|
| 2020/0294188 | A1 | 9/2020 | Tsukagoshi | |
| 2022/0217322 | A1 * | 7/2022 | Alfaro .................... | H04N 23/45 |

FOREIGN PATENT DOCUMENTS

| | | | |
|---|---|---|---|
| CN | 110519644 | A | 11/2019 |
| CN | 111131865 | A | 5/2020 |
| CN | 112584196 | A | 3/2021 |
| CN | 112770051 | A | 5/2021 |
| CN | 114584769 | A | 6/2022 |
| CN | 115209181 | A | 10/2022 |

* cited by examiner

VIDEO SYNTHESIS METHOD BASED ON SURROUND VIEWING ANGLE, CONTROLLER AND STORAGE MEDIUM

CROSS REFERENCE OF RELATED APPLICATION

The present disclosure is the U.S. national phase of PCT Application PCT/CN2023/099344 filed on Jun. 9, 2023, which claims a priority of Chinese patent disclosure No. 202210651322.7 filed on Jun. 9, 2022, which are incorporated herein by reference in its entirety.

TECHNICAL FIELD

The present disclosure relates to the technical field of video synthesis, and in particular to a video synthesis method based on surround view, a controller and a storage medium.

BACKGROUND

At present, most surround video synthesis adopts tolerance stitching. The synthesized video data is processed by the streaming server and video codec, transmitted to the broadcast end for full decoding, and then presented to the user. However, the surround synthesis processing time in related technologies is relatively long, and the amount of synthesized data to be transmitted is relatively large. Some low-end and mid-range terminal devices are prone to overheating or processor overheating when using free view, which is not conducive to the universalization and application of free view function in the ultra-high-definition field.

SUMMARY

To be achieved by the embodiments of the present disclosure is to provide a video synthesis method based on surround view angle, controller and storage medium, so as to solve the problems that the current terminal devices are prone to overheating or processor overheating when using free view and cannot realize the universalization and application of free view function in the ultra-high-definition field.

The embodiment of the present disclosure provides a video synthesis method based on surround viewing angle, applied to a client and including:

after receiving video data pushed by a server, parsing the video data according to a first viewing angle range predetermined in the video data, and presenting an image;

after receiving a user's viewing angle adjustment input, determining a second viewing angle range adjusted by the user, according to the viewing angle adjustment input; and performing, according to the second viewing angle range, an adaptive frame interpolation processing to obtain an adaptive image that meets the second viewing angle range, and performing a presentation based on the adaptive image.

Optionally, after receiving the user's viewing angle adjustment input, the determining the second viewing angle range adjusted by the user according to the viewing angle adjustment input includes:

when receiving a first input of the user to a play frame, popping up at least one viewing angle dial in the play frame;

adjusting a play viewing angle range of the image according to a second input of the user to the viewing angle dial; and when receiving a third input from the user, determining the current play viewing angle range to be a second viewing angle range.

Optionally, the performing, according to the second viewing angle range, the adaptive frame interpolation processing to obtain the adaptive image that meets the second viewing angle range includes:

determining a rotation angle and a rotation direction of a viewing angle change according to the second viewing angle range and the first viewing angle range;

starting from a boundary corresponding to the rotation direction, traversing the image of each frame within a rotation angle range according to the rotation direction;

performing a preset frame interpolation process on the images of adjacent frames to obtain the adaptive image.

Optionally, the performing the preset frame interpolation process on the images of adjacent frames to obtain the adaptive image includes:

mapping the image of each frame to a cylindrical surface or a spherical surface, according to a preset first algorithm;

extracting projection feature points of the image on the cylindrical surface or the spherical surface;

obtaining a distance difference of the projection feature points, according to a correspondence between the projection feature points of two adjacent frames;

when the distance difference is less than a threshold, solving a homography according to the projection feature points, and performing a stitching process to obtain the adaptive image;

when the distance difference is greater than or equal to the threshold, returning to the step of traversing the image of each frame within the rotation angle range starting from the corresponding boundary angle in the rotation direction.

Optionally, after the performing the presentation based on the adaptive image, the method further includes:

recording the second viewing angle range as the first viewing angle range;

when receiving the viewing angle adjustment input of the user again, capturing again, according to the viewing angle adjustment input, the second viewing angle range adjusted by the user.

Optionally, the number of the viewing angle dial is one;

a first rotation direction of the viewing angle dial corresponds to a preset first viewing angle rotation direction, and a first unit rotation angle on the viewing angle dial corresponds to a first preset unit viewing angle rotation angle.

Optionally, the number of the viewing angle dials is at least two, and the at least two viewing angle dials include a first viewing angle dial and a second viewing angle dial;

where a second rotation direction of the first viewing angle dial corresponds to a preset second viewing angle rotation direction, and a second unit rotation angle on the first viewing angle dial corresponds to a second preset unit viewing angle rotation angle;

a third rotation direction of the second viewing angle dial corresponds to the second rotation direction, and a third unit rotation angle on the second viewing angle dial corresponds to a third preset unit viewing angle rotation angle, where the third preset unit viewing angle rotation angle is smaller than the second preset unit viewing angle rotation angle;

or, the third rotation direction of the second viewing angle dial corresponds to a preset third viewing angle rotation direction, and the third unit rotation angle on the second viewing angle dial corresponds to a third preset unit viewing angle rotation angle, where the third viewing angle rotation direction is perpendicular to the second viewing angle rotation direction.

A video synthesis method based on surround view is provided in another embodiment of the present disclosure, applied to a server and including:

after receiving a data packet which is transmitted by a shooting end through a signal, parsing the data packet to obtain a video data;

determining a first viewing angle range for presenting the video data according to a shooting method; and when receiving a video request, pushing the video data to a corresponding client.

Optionally, after receiving the data packet which is transmitted by the shooting end through the signal, the parsing the data packet to obtain the video data includes:

decompressing the data packet to obtain the video data;

detecting a color curve of the image in the video data automatically, and performing a color correction on the part of the image of two adjacent frames whose color difference is greater than a first difference value.

Optionally, after receiving the data packet which is transmitted by the shooting end through the signal, the parsing the data packet to obtain the video data includes:

decompressing the data packet to obtain the video data;

performing a pre-loading analysis on a surround angle of the video data, and when a picture difference between the images of two adjacent frames is greater than a second difference, generating a frame of transition image and inserting the frame of transition image into the video data.

A controller is provided in another embodiment of the present disclosure, applied to a client, including:

a first processing module, configured to, after receiving video data pushed by a server, parse the video data according to a first viewing angle range predetermined in the video data, and present an image;

a second processing module, configured to, after receiving a user's viewing angle adjustment input, determine a second viewing angle range adjusted by the user, according to the viewing angle adjustment input; and a third processing module, configured to perform, according to the second viewing angle range, an adaptive frame interpolation processing to obtain an adaptive image that meets the second viewing angle range, and perform a presentation based on the adaptive image.

Optionally, the second processing module includes:

a first processing sub-module, configured to, when receiving a first input of the user to a play frame, pop up at least one viewing angle dial in the play frame;

a second processing sub-module, configured to adjust a play viewing angle range of the image according to a second input of the user to the viewing angle dial; and a third processing sub-module, configured to, when receiving a third input from the user, determine the current play viewing angle range to be a second viewing angle range.

Optionally, the third processing module includes:

a fourth processing sub-module, configured to determine a rotation angle and a rotation direction of a viewing angle change according to the second viewing angle range and the first viewing angle range;

a fifth processing sub-module, configured to, starting from a boundary corresponding to the rotation direction, traverse the image of each frame within a rotation angle range according to the rotation direction;

a sixth processing sub-module, configured to perform a preset frame interpolation process on the images of adjacent frames to obtain the adaptive image.

Optionally, the sixth processing sub-module includes:

a first processing unit, configured to map the image of each frame to a cylindrical surface or a spherical surface, according to a preset first algorithm;

a second processing unit, configured to extract projection feature points of the image on the cylindrical surface or the spherical surface;

a third processing unit, configured to obtain a distance difference of the projection feature points, according to a correspondence between the projection feature points of two adjacent frames;

a fourth processing unit, configured to, when the distance difference is less than a threshold, solve a homography according to the projection feature points, and perform a stitching process to obtain the adaptive image;

a fifth processing unit, configured to, when the distance difference is greater than or equal to the threshold, return to the step of traversing the image of each frame within the rotation angle range starting from the corresponding boundary angle in the rotation direction.

Optionally, the controller further includes:

a seventh processing unit, configured to record the second viewing angle range as the first viewing angle range;

an eighth processing unit, configured to when receiving the viewing angle adjustment input of the user again, capture again, according to the viewing angle adjustment input, the second viewing angle range adjusted by the user.

Optionally, the number of the viewing angle dial is one;

a first rotation direction of the viewing angle dial corresponds to a preset first viewing angle rotation direction, and a first unit rotation angle on the viewing angle dial corresponds to a first preset unit viewing angle rotation angle.

Optionally, the number of the viewing angle dials is at least two, and the at least two viewing angle dials include a first viewing angle dial and a second viewing angle dial;

where a second rotation direction of the first viewing angle dial corresponds to a preset second viewing angle rotation direction, and a second unit rotation angle on the first viewing angle dial corresponds to a second preset unit viewing angle rotation angle;

a third rotation direction of the second viewing angle dial corresponds to the second rotation direction, and a third unit rotation angle on the second viewing angle dial corresponds to a third preset unit viewing angle rotation angle, where the third preset unit viewing angle rotation angle is smaller than the second preset unit viewing angle rotation angle;

or, the third rotation direction of the second viewing angle dial corresponds to a preset third viewing angle rotation direction, and the third unit rotation angle on the second viewing angle dial corresponds to a third preset unit viewing angle rotation angle, where the third viewing angle rotation direction is perpendicular to the second viewing angle rotation direction.

A controller is provided in another embodiment of the present disclosure, applied to a server, including:

a fourth processing module, configured to, after receiving a data packet which is transmitted by a shooting end through a signal, parse the data packet to obtain a video data;

a fifth processing module, configured to determine a first viewing angle range for presenting the video data according to a shooting method; and a sixth processing module, configured to, when receiving a video request, push the video data to a corresponding client.

Optionally, the fourth processing module includes:

a seventh processing sub-module, configured to decompress the data packet to obtain the video data;

an eighth processing sub-module, configured to detect a color curve of the image in the video data automatically, and perform a color correction on the part of the image of two adjacent frames whose color difference is greater than a first difference value; and/or a ninth processing sub-module, configured to perform a pre-loading analysis on a surround angle of the video data, and when a picture difference between the images of two adjacent frames is greater than a second difference, generate a frame of transition image and inserting the frame of transition image into the video data.

A computer-readable storage medium is provided in another embodiment of the present disclosure, storing a computer program, where when the computer program is executed by a processor, the computer program performs the video synthesis method based on surround viewing angle applied to the client, or performs the video synthesis method based on surround viewing angle applied to the server.

An electronic device is provided in another embodiment of the present disclosure, including a processor, a memory, and a program or instruction stored in the memory and executable on the processor, where the program or instruction, when executed by the processor, performs the video synthesis method based on surround viewing angle applied to the client, or performs the video synthesis method based on surround viewing angle applied to the server.

A chip is provided in another embodiment of the present disclosure, including a processor and a communication interface, where the communication interface is coupled to the processor, and the processor is configured to run a program or instruction to perform the video synthesis method based on surround viewing angle applied to the client, or perform the video synthesis method based on surround viewing angle applied to the server.

The embodiment of the present disclosure provides a surround-view video synthesis method, controller, and storage medium, which have at least the following beneficial effects:

When the client presents an image based on the video data, it will only parse and present it based on the first viewing angle range predetermined in the video data, and treat other data as redundant data, thereby reducing the amount of calculation, which is beneficial to improving the smoothness when presenting videos or sequence images, and avoiding the terminal device or processor from overheating. When the user adjusts the viewing angle, the second viewing angle range that the user wants to obtain after the adjustment is determined based on the viewing angle adjustment input, and then the adaptive frame interpolation process is performed only on the image within the second viewing angle range to obtain an adaptive image that meets the second viewing angle range, so as to present it. This is also beneficial to reduce the amount of calculation, and to avoid the occurrence of freezes due to the long interval between two frames of images, ensuring the smoothness of image presentation, and facilitating the universal applicability and application of the free viewing angle function in the ultra-high-definition field.

DETAILED DESCRIPTION

I To make the technical problems, technical solutions and advantages to be solved by the present disclosure clearer, the following will be described in detail in conjunction with the accompanying drawings and specific embodiments. In the following description, specific details such as specific configurations and components are provided only to help fully understand the embodiments of the present disclosure. Therefore, it should be clear to those skilled in the art that various changes and modifications can be made to the embodiments described herein without departing from the scope and spirit of the present disclosure. In addition, for clarity and brevity, the description of known functions and structures has been omitted.

It should be understood that the references to "one embodiment" or "an embodiment" throughout the specification mean that the specific features, structures, or characteristics associated with the embodiment are included in at least one embodiment of the present disclosure. Therefore, the references to "in one embodiment" or "in an embodiment" appearing throughout the specification do not necessarily refer to the same embodiment. In addition, these specific features, structures, or characteristics may be combined in any suitable manner in one or more embodiments.

In the various embodiments of the present disclosure, it should be understood that the size of the serial numbers of the following processes does not mean the order of execution. The execution order of each process should be determined by its function and internal logic, and should not constitute any limitation on the implementation process of the embodiments of the present disclosure.

It should be understood that the term "and/or" in this document is only a description of the association relationship of associated objects, indicating that there may be three relationships. For example, A and/or B can represent: A exists alone, A and B exist at the same time, and B exists alone. In addition, the character "/" in this document generally indicates that the objects associated with each other are in an "or" relationship. In the embodiments provided in this application, it should be understood that "B corresponding to A" means that B is associated with A, and B can be determined based on A. However, it should also be understood that determining B based on A does not mean that B is determined only based on A, but B can also be determined based on A and/or other information.

Figure 1:
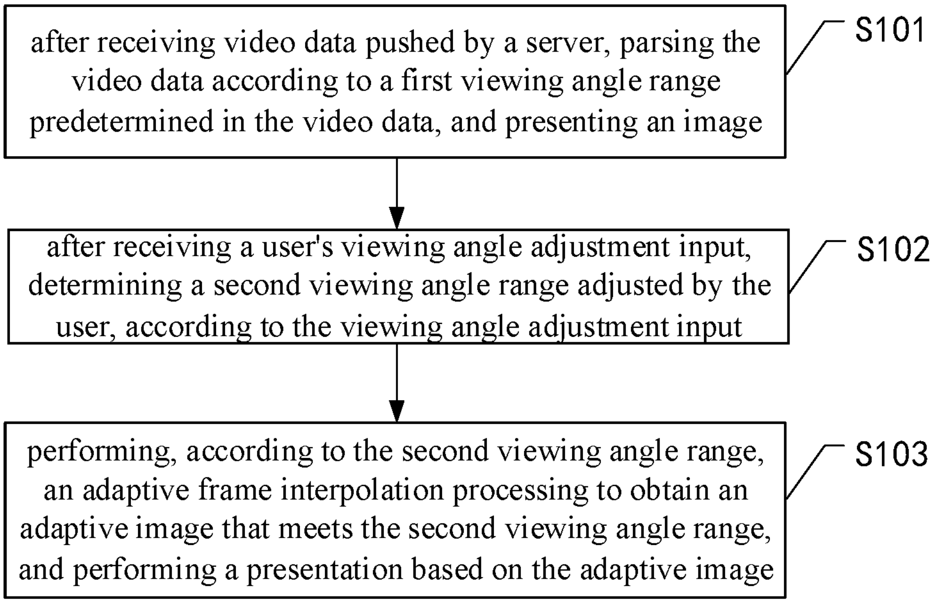
FIG. 1 is a first flow chart of a video synthesis method based on surround view applied to a client in the present disclosure.

Referring to FIG. 1, an embodiment of the present disclosure provides a video synthesis method based on surround viewing angles, which is applied to a client and includes:

Step S101: after receiving video data pushed by a server, parsing the video data according to a first viewing angle range predetermined in the video data, and presenting an image;

Step S102: after receiving a user's viewing angle adjustment input, determining a second viewing angle range adjusted by the user, according to the viewing angle adjustment input; and Step S103: performing, according to the second viewing angle range, an adaptive frame interpolation processing to obtain an adaptive image that meets the second viewing angle range, and performing a presentation based on the adaptive image.

one embodiment of the present disclosure, a method for video synthesis for surround perspective applied to a client is provided, where, after receiving the required video data pushed by the server, the client parses and presents the image according to a first perspective range predetermined in the video data, while the video data of other perspectives except the first perspective range are not parsed, but are first treated as redundant data, thereby reducing the amount of calculation, which is beneficial to improving the fluency when presenting videos or sequence images, and avoiding the overheating of the terminal device or processor.

When the client uses the first viewing angle range to present an image, if the user's viewing angle adjustment input is received, it is determined that the user is using the free viewing angle function of the client. At this time, in order to present the image of the corresponding viewing angle to the user, the second viewing angle range that the user wants to obtain after the adjustment is determined based on the viewing angle adjustment input, and then the image within the second viewing angle range is adaptively interpolated based on the second viewing angle range to obtain an adaptive image that meets the second viewing angle range for presentation, where only the image within the second viewing angle range needs to be processed, and the video data of other viewing angles is used as redundant data, which is beneficial to reduce the amount of calculation; and through adaptive frame interpolation processing, it is beneficial to avoid the occurrence of freezes due to too long an interval between two frames of images, thereby ensuring the smoothness of image presentation and facilitating the universal applicability and application of the free viewing angle function in the ultra-high-definition field.

Figure 2:
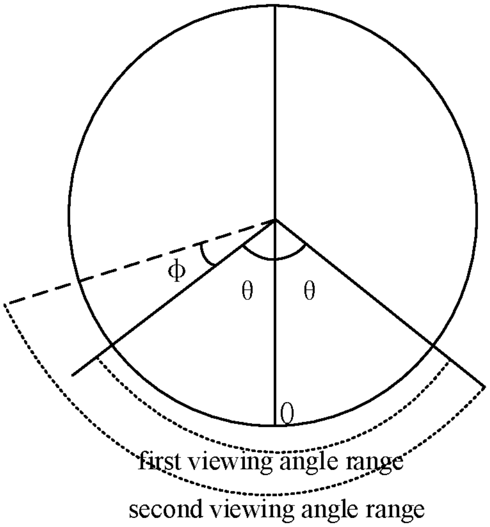
FIG. 2 is a schematic view of a change in viewing angle range.

Referring to FIG. 2, in one embodiment, the viewing angle of the first viewing angle range is 2θ, θ which is a positive value, specifically 30 degrees, 60 degrees or other positive values, the center of the first viewing angle range is 0 degrees, and the viewing angle is only offset in one direction for explanation. At this time, the first viewing angle range can be expressed as [−θ, θ], when the second viewing angle range is rotated by q along the first direction based on the first viewing angle range, the second viewing angle range is [−(θ+φ), θ]. Both the first viewing angle range and the second viewing angle range already include the play viewing angle of the terminal device.

It should be noted that when the user takes a long time to input the viewing angle adjustment, the subsequent steps of determining the second viewing angle range adjusted by the user and performing adaptive frame interpolation processing according to the second viewing angle range to obtain an adaptive image that meets the second viewing angle range and presenting the image according to the adaptive image can be performed in batches, and the time for each time does not exceed a preset unit time.

Figure 3:
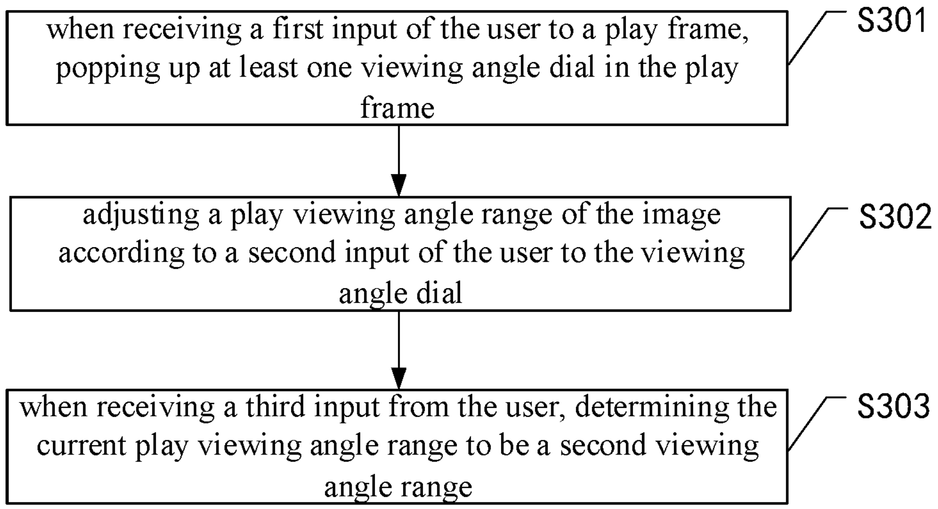
FIG. 3 is a second flow chart of a video synthesis method based on surround view applied to a client in the present disclosure.

Referring to FIG. 3, optionally, in the video synthesis method described above, after receiving the user's viewing angle adjustment input, determining the second viewing angle range adjusted by the user according to the viewing angle adjustment input includes:

Step S301: when receiving a first input of the user to a play frame, popping up at least one viewing angle dial in the play frame;

Step S302: adjusting a play viewing angle range of the image according to a second input of the user to the viewing angle dial; and Step S303: when receiving a third input from the user, determining the current play viewing angle range to be a second viewing angle range.

In an embodiment of the present disclosure, when a first input to the play frame is received, it can be determined that the user has a need to adjust the viewing angle, and at least one viewing angle dial pops up in the play frame, so that the user can adjust the viewing angle through the viewing angle dial. Optionally, the first input at this time includes but is not limited to clicking, continuously clicking or long pressing the first preset position on the play frame, or continuously clicking or long pressing any position on the play frame. A certain angle mark can be set on the viewing angle dial so that the user can select a suitable offset angle according to needs.

Furthermore, based on the user's second input to the viewing angle dial, the viewing angle range of the image can be adjusted, and the adjustment method includes but is not limited to left and right rotation and/or up and down rotation of the viewing angle range, and the second output includes but is not limited to operations such as rotating or clicking the viewing angle dial.

When the user's third input is received, it is determined that the playback perspective range currently selected by the user is the second perspective range, where the third input includes but is not limited to the user's no operation within a preset time, or the user clicks, continuously clicks, or long presses on a second preset position on or in the playback box, and the second preset position may be the same as the first preset position, or may be located on the perspective dial.

Figure 4:
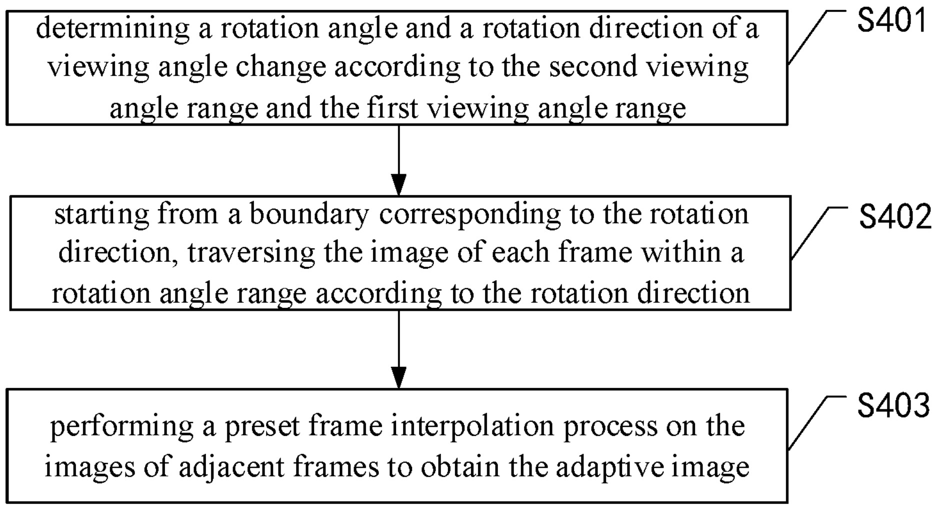
FIG. 4 is a third flow chart of the surround view video synthesis method applied to the client in the present disclosure.

Referring to FIG. 4, optionally, in the video synthesis method as described above, the step of performing adaptive frame interpolation processing according to the second viewing angle range to obtain an adaptive image satisfying the second viewing angle range includes:

Step S401: determining a rotation angle and a rotation direction of a viewing angle change according to the second viewing angle range and the first viewing angle range;

Step S402: starting from a boundary corresponding to the rotation direction, traversing the image of each frame within a rotation angle range according to the rotation direction;

Step S403: performing a preset frame interpolation process on the images of adjacent frames to obtain the adaptive image.

In another embodiment of the present disclosure, when adaptive frame interpolation processing is performed according to the second viewing angle range, it is preferred to determine the rotation angle and rotation direction of the viewing angle change according to the adjusted second viewing angle range and the first viewing angle range before adjustment. Then, starting from the boundary corresponding to the rotation direction, the image of each frame within the rotation angle range is traversed according to the rotation direction; that is, the image of each frame within the angle range that needs to be added (the image that is not presented) is obtained from the data that is not currently presented. It can also be understood that there is currently a frame of image, and the image that can be presented corresponds to 360 degrees. The currently presented image is a 60-degree image [−30°, 30°] centered at 0 degrees, that is, an image. At this time, because the viewing angle is rotated 30° to the left, [−60°, −30°) the image within the image needs to be added to the existing image for presentation. Therefore, it is necessary to first obtain the image within the image from the redundant data as the image in each frame. Then, by performing [−60°, −30°) preset frame interpolation processing on the images of adjacent frames, the adaptive image to be presented is obtained.

Figure 5:
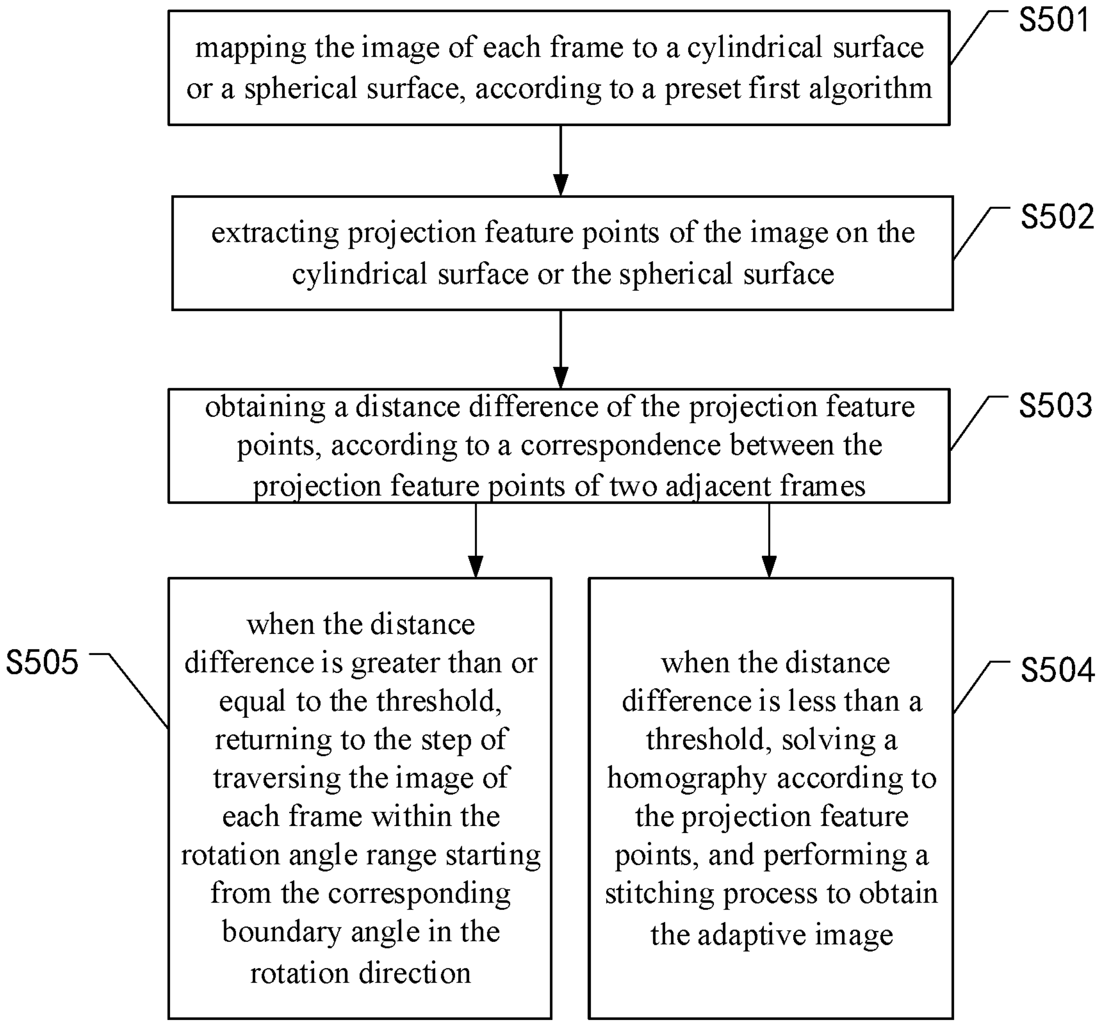
FIG. 5 is a fourth flow chart of a surround-view video synthesis method applied to a client in the present disclosure.

Referring to FIG. 5, further, in the above-mentioned video synthesis method, the step of performing preset frame interpolation processing on images of adjacent frames to obtain an adaptive image includes:

Step S501: mapping the image of each frame to a cylindrical surface or a spherical surface, according to a preset first algorithm;

Step S502: extracting projection feature points of the image on the cylindrical surface or the spherical surface;

Step S503: obtaining a distance difference of the projection feature points, according to a correspondence between the projection feature points of two adjacent frames;

Step S504: when the distance difference is less than a threshold, solving a homography according to the projection feature points, and performing a stitching process to obtain the adaptive image;

Step S505: when the distance difference is greater than or equal to the threshold, returning to the step of traversing the image of each frame within the rotation angle range starting from the corresponding boundary angle in the rotation direction.

In another embodiment of the present disclosure, a step of performing preset frame interpolation processing on images of adjacent frames to obtain an adaptive image to be presented is specifically disclosed, where the image obtained above is first mapped to a cylinder or a sphere according to a preset first algorithm (for example, a deformation algorithm (such as warp), using a transformation matrix to map the image, where when the viewing angle only needs to be rotated in one direction, it can be mapped to the cylinder or the sphere, and when the viewing angle needs to be rotated in two mutually perpendicular directions, it can only be mapped to the sphere.

Then, the projection feature points of each frame image on the cylinder or sphere are extracted. The number of the projection feature points can be multiple, and each projection feature point is recorded as:

$$\lambda_i^n,$$

$n \in N_i$, where i represents the i-th frame image, and $N_i$ represents the number of projection feature points on the i-th frame image; since the number of feature points on each frame image or the image of adjacent frames may fluctuate within a small range, the number of projection feature points of each frame is not necessarily equal to the total number of corresponding feature points; the projection feature points can be realized by scale-invariant feature transform (SIFT), where SIFT is a description used in the field of image processing, which has scale invariance and can detect key points in the image, and is a local feature descriptor.

Furthermore, the correspondence between the projection feature points on the cylinder or spherical surface of the two previous and next frames is calculated, and the distance difference between the corresponding feature points is calculated $$\sum_{n \in N} \lambda_i^n - \lambda_{i+1}^n,$$

where N is the total number of projection feature points.

When the distance difference is less than a threshold, it means that the images of the previous and next frames are very close and can transition smoothly during playback. At this time, the homography can be solved according to the projection feature points (that is, the image mapped on the cylinder or sphere is restored) and spliced with the existing image to obtain the corresponding adaptive image.

When the distance difference is greater than or equal to the threshold, it is determined that the images of the previous and next frames are far apart. If interpolation is not performed, problems such as freeze or unsmoothness may occur during image presentation, affecting the viewing experience. Therefore, interpolation is performed between the two frames, and the image is returned to be re-acquired so that the final images can be presented smoothly.

It should be noted that the threshold can be set manually or calculated based on the requirements of the device terminal for smoothness, etc. By changing the threshold, especially lowering the threshold, a clearer and smoother viewing effect can be achieved.

Preferably, after the step of presenting according to the adaptive image, the method further includes:

recording the second viewing angle range as the first viewing angle range;

when receiving the viewing angle adjustment input of the user again, capturing again, according to the viewing angle adjustment input, the second viewing angle range adjusted by the user.

In another embodiment of the present disclosure, a further video synthesis method is provided, that is, after the user adjusts the viewing angle once, the second viewing angle range at this time is recorded as the first viewing angle range, and when the user needs to adjust the viewing angle again, the adjustment can be made on this basis, so as to avoid repeated calculation caused by re-adjusting from the original first viewing angle range.

Optionally, in the video synthesis method as described above, there is one viewing angle dial;

The first rotation direction of the viewing angle dial corresponds to a preset first viewing angle rotation direction, and the first unit rotation angle on the viewing angle dial corresponds to a first preset unit viewing angle rotation angle.

Figure 6:
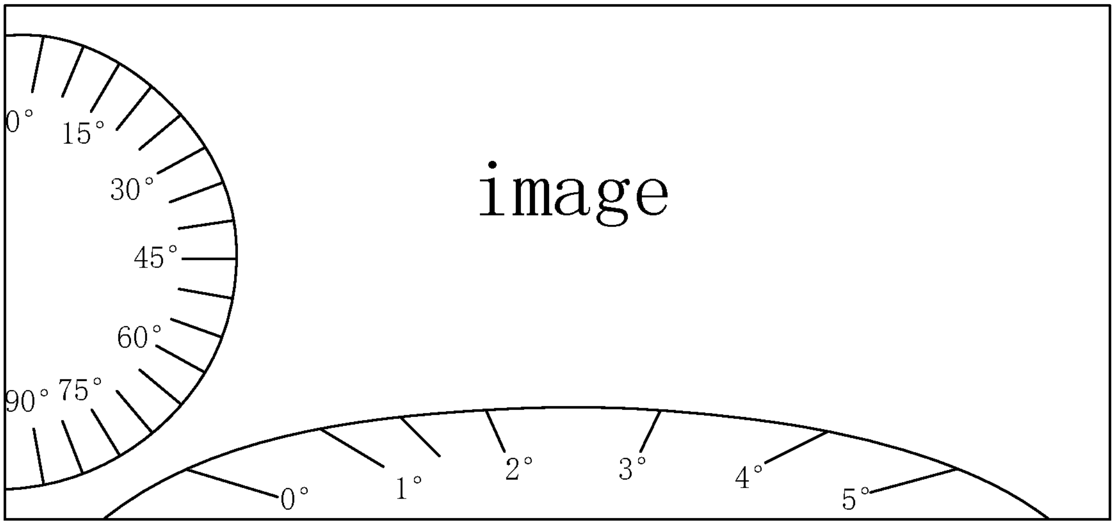
FIG. 6 is a first schematic view of a viewing angle dial applied to a client in the present disclosure.
Figure 7:
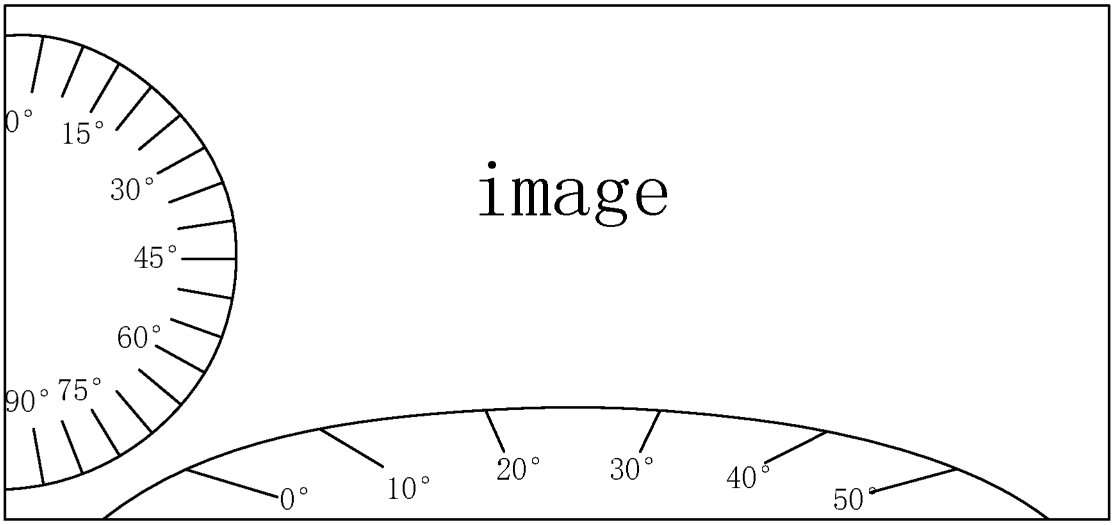
FIG. 7 is a second schematic view of the viewing angle dial applied to the client of the present disclosure.

Referring to FIG. 6 and FIG. 7, optionally, in the video synthesis method described above, there are at least two viewing angle dials;

a second rotation direction of the first viewing angle dial corresponds to a preset second viewing angle rotation direction, and a second unit rotation angle on the first viewing angle dial corresponds to a second preset unit viewing angle rotation angle;

a third rotation direction of the second viewing angle dial corresponds to the second rotation direction, and a third unit rotation angle on the second viewing angle dial corresponds to a third preset unit viewing angle rotation angle, where the third preset unit viewing angle rotation angle is smaller than the second preset unit viewing angle rotation angle;

or, the third rotation direction of the second viewing angle dial corresponds to a preset third viewing angle rotation direction, and the third unit rotation angle on the second viewing angle dial corresponds to a third preset unit viewing angle rotation angle, where the third viewing angle rotation direction is perpendicular to the second viewing angle rotation direction.

When there are at least two viewing angle dials, the second viewing angle dial (as shown in the horizontal dial in FIG. 6) can be a fine supplement to the first viewing angle dial (as shown in the vertical dial in FIG. 6) to facilitate the user to make more precise viewing angle adjustments; it can also be perpendicular to the rotation direction of the first viewing angle dial to facilitate spherical 360-degree rotation (as shown in the horizontal dial in FIG. 7).

Figure 8:
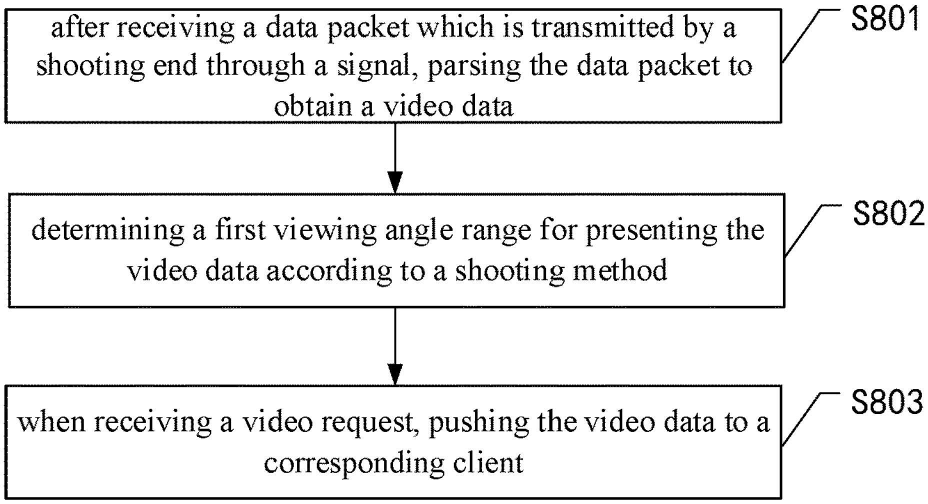
FIG. 8 is a flow chart of a method for video synthesis based on surround view applied to a server in the present disclosure.

Referring to FIG. 8, another embodiment of the present disclosure further provides a method for video synthesis based on surround viewing angles, which is applied to a server and includes:

Step S801: after receiving a data packet which is transmitted by a shooting end through a signal, parsing the data packet to obtain a video data;

Step S802: determining a first viewing angle range for presenting the video data according to a shooting method; and Step S803: when receiving a video request, pushing the video data to a corresponding client.

In another embodiment of the present disclosure, a video synthesis method applied to a server is also provided, where the server, after receiving a data packet transmitted by a shooting end through a signal, parses the data packet to obtain a complete sequence of images or videos as video data, and based on the shooting method, predetermines a first viewing angle range for presenting the video data, so that when the client requests and receives the video data, it can prioritize the first viewing angle range for parsing and presenting, while video data of other viewing angles except the first viewing angle range are not parsed, but are first treated as redundant data, thereby reducing the amount of calculation, which is beneficial to improving the smoothness when presenting videos or sequence images, and avoiding the overheating of terminal devices or processors.

Preferably, after receiving the data packet which is transmitted by the shooting end through the signal, the parsing the data packet to obtain the video data includes:

decompressing the data packet to obtain the video data;

detecting a color curve of the image in the video data automatically, and performing a color correction on the part of the image of two adjacent frames whose color difference is greater than a first difference value;

and/or, performing a pre-loading analysis on a surround angle of the video data, and when a picture difference between the images of two adjacent frames is greater than a second difference, generating a frame of transition image and inserting the frame of transition image into the video data.

In another embodiment of the present disclosure, after receiving the data packet, the data packet will be decompressed to obtain the video data, and then the color in the image can be detected and corrected, and the exposure of the single frame image with overexposed color in the sequence can be automatically lowered, so as to partially eliminate or reduce the adverse effects of video screen jitter or flickering caused by objective factors such as ambient lighting, shutter array, and signal packet loss on the "broadcast display" link in the two links of "live shooting" and "signal transmission", thereby reducing the interference of the original data on the calculation of subsequent steps. It is also possible to calculate the picture difference between two adjacent frames by preloading the surround angle analysis of the original image of the surround frame sequence. If the interpolation is too large, a frame of transition image insertion is automatically generated to make the original angle smooth. The above processing of the original video data helps the subsequent client to quickly read the optimal original data when presenting, and improves the efficiency of "collection, editing, and playback" between other production systems when processing surround videos.

Figure 9:
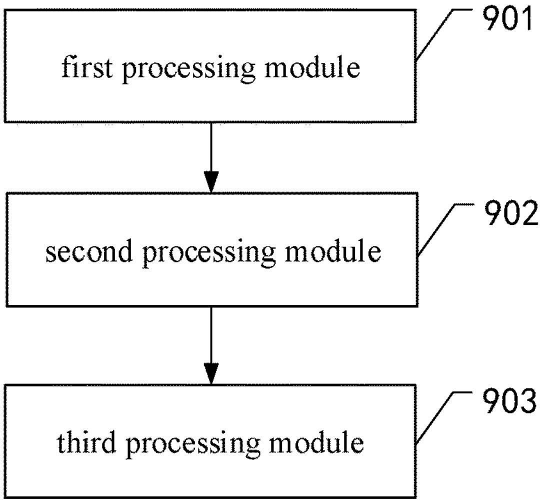
FIG. 9 is a schematic view of a structure of the controller applied to a client in the present disclosure.

Referring to FIG. 9, another embodiment of the present disclosure further provides a controller, which is applied to a client, and the controller includes:

a first processing module 901, configured to, after receiving video data pushed by a server, parse the video data according to a first viewing angle range predetermined in the video data, and present an image;

a second processing module, 902 configured to, after receiving a user's viewing angle adjustment input, determine a second viewing angle range adjusted by the user, according to the viewing angle adjustment input; and a third processing module 903, configured to perform, according to the second viewing angle range, an adaptive frame interpolation processing to obtain an adaptive image that meets the second viewing angle range, and perform a presentation based on the adaptive image.

Optionally, the second processing module 902 includes:

a first processing sub-module, configured to, when receiving a first input of the user to a play frame, pop up at least one viewing angle dial in the play frame;

a second processing sub-module, configured to adjust a play viewing angle range of the image according to a second input of the user to the viewing angle dial; and a third processing sub-module, configured to, when receiving a third input from the user, determine the current play viewing angle range to be a second viewing angle range.

Optionally, the third processing module 903 includes:

a fourth processing sub-module, configured to determine a rotation angle and a rotation direction of a viewing angle change according to the second viewing angle range and the first viewing angle range;

a fifth processing sub-module, configured to, starting from a boundary corresponding to the rotation direction, traverse the image of each frame within a rotation angle range according to the rotation direction;

a sixth processing sub-module, configured to perform a preset frame interpolation process on the images of adjacent frames to obtain the adaptive image.

Optionally, the sixth processing sub-module includes:

a first processing unit, configured to map the image of each frame to a cylindrical surface or a spherical surface, according to a preset first algorithm;

a second processing unit, configured to extract projection feature points of the image on the cylindrical surface or the spherical surface;

a third processing unit, configured to obtain a distance difference of the projection feature points, according to a correspondence between the projection feature points of two adjacent frames;

a fourth processing unit, configured to, when the distance difference is less than a threshold, solve a homography according to the projection feature points, and perform a stitching process to obtain the adaptive image;

a fifth processing unit, configured to, when the distance difference is greater than or equal to the threshold, return to the step of traversing the image of each frame within the rotation angle range starting from the corresponding boundary angle in the rotation direction.

Optionally, the controller further includes:

a seventh processing unit, configured to record the second viewing angle range as the first viewing angle range;

an eighth processing unit, configured to when receiving the viewing angle adjustment input of the user again, capture again, according to the viewing angle adjustment input, the second viewing angle range adjusted by the user.

Optionally, the number of the viewing angle dial is one;

a first rotation direction of the viewing angle dial corresponds to a preset first viewing angle rotation direction, and a first unit rotation angle on the viewing angle dial corresponds to a first preset unit viewing angle rotation angle.

Optionally, the number of the viewing angle dials is at least two, and the at least two viewing angle dials include a first viewing angle dial and a second viewing angle dial;

where a second rotation direction of the first viewing angle dial corresponds to a preset second viewing angle rotation direction, and a second unit rotation angle on the first viewing angle dial corresponds to a second preset unit viewing angle rotation angle;

a third rotation direction of the second viewing angle dial corresponds to the second rotation direction, and a third unit rotation angle on the second viewing angle dial corresponds to a third preset unit viewing angle rotation angle, where the third preset unit viewing angle rotation angle is smaller than the second preset unit viewing angle rotation angle;

or, the third rotation direction of the second viewing angle dial corresponds to a preset third viewing angle rotation direction, and the third unit rotation angle on the second viewing angle dial corresponds to a third preset unit viewing angle rotation angle, where the third viewing angle rotation direction is perpendicular to the second viewing angle rotation direction.

The embodiment of the controller applied to the client of the present disclosure is a device corresponding to the embodiment of the video synthesis method based on surround perspective applied to the client mentioned above. All implementation means in the above method embodiment are applicable to the embodiment of the controller and can achieve the same technical effect.

Figure 10:
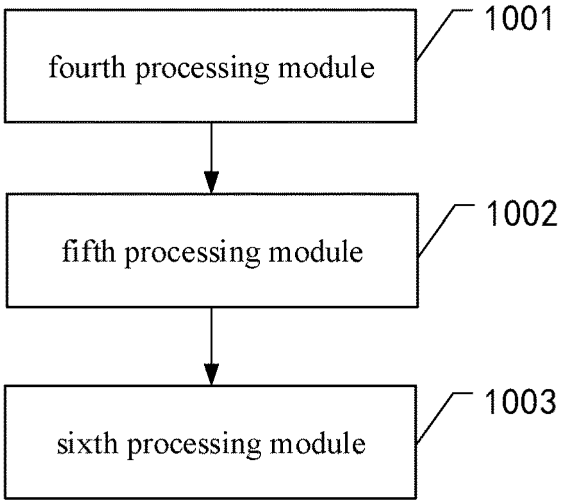
FIG. 10 is a schematic view of a structure of the controller applied to the server side in the present disclosure.

Referring to FIG. 10, another embodiment of the present disclosure further provides a controller, which is applied to a server, and the controller includes:

a fourth processing module 1001, configured to, after receiving a data packet which is transmitted by a shooting end through a signal, parse the data packet to obtain a video data;

a fifth processing module 1002, configured to determine a first viewing angle range for presenting the video data according to a shooting method; and a sixth processing module 1003, configured to, when receiving a video request, push the video data to a corresponding client.

Optionally, the fourth processing module 1001 includes:

a seventh processing sub-module, configured to decompress the data packet to obtain the video data;

an eighth processing sub-module, configured to detect a color curve of the image in the video data automatically, and perform a color correction on the part of the image of two adjacent frames whose color difference is greater than a first difference value; and/or a ninth processing sub-module, configured to perform a pre-loading analysis on a surround angle of the video data, and when a picture difference between the images of two adjacent frames is greater than a second difference, generate a frame of transition image and inserting the frame of transition image into the video data.

The embodiment of the controller applied to the server side of the present disclosure is a device corresponding to the embodiment of the video synthesis method based on surround perspective applied to the server side. All implementation means in the above-mentioned method embodiment are applicable to the embodiment of the controller and can achieve the same technical effect.

Another embodiment of the present disclosure further provides a computer-readable storage medium, on which a computer program is stored. When the computer program is executed by a processor, the steps of the above-mentioned video synthesis method based on surround perspective applied to the client are implemented, or the steps of the above-mentioned video synthesis method based on surround perspective applied to the server are implemented, and the same technical effect can be achieved.

Another embodiment of the present disclosure also provides an electronic device, including a processor, a memory, and a program or instruction stored in the memory and executable on the processor, where the program or instruction, when executed by the processor, implements the steps of the video synthesis method based on surround perspective applied to the client as described above, or implements the steps of the video synthesis method based on surround perspective applied to the server as described above, and can achieve the same technical effect.

Another embodiment of the present disclosure also provides a chip, including a processor and a communication interface, where the communication interface is coupled to the processor, and the processor is used to run a program or instruction to implement the steps of the video synthesis method based on surround perspective applied to the client as described above, or to implement the steps of the video synthesis method based on surround perspective applied to the server as described above, and can achieve the same technical effect.

In addition, the present disclosure may repeat reference numerals and/or letters in different examples. This repetition is for the purpose of simplicity and clarity, and does not in itself indicate the relationship between the various embodiments and/or settings discussed.

It should also be noted that, in this article, relational terms such as first and second, etc. are only used to distinguish one entity or operation from another entity or operation, and do not necessarily require or imply any such actual relationship or order between these entities or operations. Moreover, the terms "include", "includes" or any other variations thereof are intended to cover non-exclusive inclusions.

The above is an optional implementation mode of the present disclosure. It should be pointed out that for ordinary technicians in this technical field, several improvements and modifications can be made without departing from the principles described in the present disclosure. These improvements and modifications should also be regarded as the scope of protection of the present disclosure.

What is claimed is:

1. A video synthesis method based on surround viewing angle, applied to a client and comprising:

after receiving video data pushed by a server, parsing the video data according to a first viewing angle range predetermined in the video data, and presenting an image;

after receiving a user's viewing angle adjustment input, determining a second viewing angle range adjusted by the user, according to the viewing angle adjustment input; and performing, according to the second viewing angle range, an adaptive frame interpolation processing to obtain an adaptive image that meets the second viewing angle range, and performing a presentation based on the adaptive image;

wherein after receiving the user's viewing angle adjustment input, the determining the second viewing angle range adjusted by the user according to the viewing angle adjustment input comprises:

when receiving a first input of the user to a play frame, popping up at least one viewing angle dial in the play frame;

adjusting a play viewing angle range of the image according to a second input of the user to the viewing angle dial; and when receiving a third input from the user, determining the current play viewing angle range to be a second viewing angle range.

2. The video synthesis method according to claim 1, wherein the performing, according to the second viewing angle range, the adaptive frame interpolation processing to obtain the adaptive image that meets the second viewing angle range comprises:

determining a rotation angle and a rotation direction of a viewing angle change according to the second viewing angle range and the first viewing angle range;

starting from a boundary corresponding to the rotation direction, traversing the image of each frame within a rotation angle range according to the rotation direction;

performing a preset frame interpolation process on the images of adjacent frames to obtain the adaptive image.

3. The video synthesis method according to claim 1, wherein after the performing the presentation based on the adaptive image, the method further comprises:

replacing the first viewing angle range with the second viewing angle range;

when receiving the viewing angle adjustment input of the user again, repeating the step of determining a second viewing angle range adjusted by the user, according to the viewing angle adjustment input.

4. The video synthesis method according to claim 1, wherein number of the viewing angle dial is one;

a first rotation direction of the viewing angle dial corresponds to a preset first viewing angle rotation direction, and a first unit rotation angle on the viewing angle dial corresponds to a first preset unit viewing angle rotation angle.

5. The video synthesis method according to claim 1, wherein the number of the viewing angle dials is at least two, and the at least two viewing angle dials comprise a first viewing angle dial and a second viewing angle dial;

wherein a second rotation direction of the first viewing angle dial corresponds to a preset second viewing angle rotation direction, and a second unit rotation angle on the first viewing angle dial corresponds to a second preset unit viewing angle rotation angle;

a third rotation direction of the second viewing angle dial corresponds to the second rotation direction, and a third unit rotation angle on the second viewing angle dial corresponds to a third preset unit viewing angle rotation angle, wherein the third preset unit viewing angle rotation angle is smaller than the second preset unit viewing angle rotation angle;

or, the third rotation direction of the second viewing angle dial corresponds to a preset third viewing angle rotation direction, and the third unit rotation angle on the second viewing angle dial corresponds to a third preset unit viewing angle rotation angle, wherein the third viewing angle rotation direction is perpendicular to the second viewing angle rotation direction.

6. A non-transitory computer-readable storage medium, storing a computer program, wherein when the computer program is executed by a processor, the computer program performs the video synthesis method based on surround viewing angle applied to the client according to claim 1.

7. An electronic device, comprising a processor, a memory, and a program or instruction stored in the memory and executable on the processor, wherein the program or instruction, when executed by the processor, performs the video synthesis method based on surround viewing angle applied to the client according to claim 1.

8. A chip, comprising a processor and a communication interface, wherein the communication interface is coupled to the processor, and the processor is configured to run a program or instruction to perform the video synthesis method based on surround viewing angle applied to the client according to claim 1.

9. The video synthesis method according to claim 2, wherein the performing the preset frame interpolation process on the images of adjacent frames to obtain the adaptive image comprises:

mapping the image of each frame to a cylindrical surface or a spherical surface, according to a preset first algorithm;

extracting projection feature points of the image on the cylindrical surface or the spherical surface;

obtaining a distance difference of the projection feature points, according to a correspondence between the projection feature points of two adjacent frames;

when the distance difference is less than a threshold, solving a homography according to the projection feature points, and performing a stitching process to obtain the adaptive image;

when the distance difference is greater than or equal to the threshold, returning to the step of traversing the image of each frame within the rotation angle range starting from the corresponding boundary angle in the rotation direction.

10. A video synthesis method based on surround view, applied to a server and comprising:

after receiving a data packet which is transmitted by a shooting end through a signal, parsing the data packet to obtain a video data;

determining a first viewing angle range for presenting the video data according to a shooting method; and when receiving a video request, pushing the video data to a corresponding client;

wherein after receiving the data packet which is transmitted by the shooting end through the signal, the parsing the data packet to obtain the video data comprises:

decompressing the data packet to obtain the video data; and detecting a color curve of the image in the video data automatically, and performing a color correction on a part of an image of a frame, wherein the part of the image of the frame has a color difference greater than a first difference value relative to a corresponding part of an image of a preceding frame; and/or performing a pre-loading analysis on a surround angle of the video data, and when images of two adjacent frames resulting from the pre-loading analysis differ from each other by a value greater than a second difference value, generating a frame of transition image and inserting the frame of transition image into the video data.

11. A non-transitory computer-readable storage medium, storing a computer program, wherein when the computer program is executed by a processor, the computer program performs the video synthesis method based on surround viewing angle applied to the client according to claim 10.

12. An electronic device, comprising a processor, a memory, and a program or instruction stored in the memory and executable on the processor, wherein the program or instruction, when executed by the processor, performs the video synthesis method based on surround viewing angle applied to the client according to claim 10.

13. A chip, comprising a processor and a communication interface, wherein the communication interface is coupled to the processor, and the processor is configured to run a program or instruction to perform the video synthesis method based on surround viewing angle applied to the client according to claim 10.

* * * * *